United States Patent [19]

Momii et al.

[11] Patent Number: 5,258,211

[45] Date of Patent: Nov. 2, 1993

[54] COATING COMPOSITION FOR AIR BAGS AND AIR BAG

[75] Inventors: Kazuma Momii; Masaharu Takahashi, both of Annaka, Japan

[73] Assignee: Shin-Etsu Chemical Co., Ltd., Tokyo, Japan

[21] Appl. No.: 865,019

[22] Filed: Apr. 8, 1992

[30] Foreign Application Priority Data

Apr. 9, 1991 [JP] Japan .................... 3-103971

[51] Int. Cl.$^5$ ................. B65D 81/14; B60R 21/16
[52] U.S. Cl. .................. 428/35.2; 428/36.1; 523/219; 525/437; 525/477; 525/479; 280/728; 280/743
[58] Field of Search ............. 280/728, 743; 428/266, 428/34.5, 36.1, 36.2; 528/24, 41, 31, 33, 34, 15; 524/588, 448, 431, 432, 434, 451, 433, 430, 444, 442, 425, 452, 789, 785, 783, 779, 786, 788, 861; 523/219; 525/437, 477, 479

[56] References Cited

U.S. PATENT DOCUMENTS

| | | | |
|---|---|---|---|
| 4,045,602 | 8/1977 | Sommer et al. | 427/386 |
| 4,587,159 | 5/1986 | Gutek et al. | 428/251 |
| 4,755,554 | 7/1988 | Itoh et al. | 524/588 |
| 4,766,185 | 8/1988 | Ryntz et al. | 525/479 |
| 4,774,281 | 9/1988 | Chaffee et al. | 524/588 |
| 5,006,372 | 4/1991 | Wolfer et al. | 427/387 |

FOREIGN PATENT DOCUMENTS 948667 6/1974 Canada .
0431881 6/1991 European Pat. Off. .

Primary Examiner—Ellis P. Robinson
Assistant Examiner—Michael A. Williamson
Attorney, Agent, or Firm—Millen, White, Zelano & Branigan

[57] ABSTRACT

A coating composition for the air bag which comprises
(A) an organopolysiloxane having a viscosity of 300 cSt or more at 25° C. which is represented by the average composition formula (1) below;

$$R_a^1 SiO_{(4-a)/2} \quad (1)$$

(where $R^1$ denotes a substituted or unsubstituted monovalent hydrocarbon group, and a is a positive number from 1.98 to 2.01.)
(B) An organosilane or a partial hydrolyzate thereof having an isocyanate group and a hydrolyzable group in the molecule.
(C) An organic peroxide.
(D) An organohydrogenpolysiloxane having in the molecule three or more ≡SiH groups.

It exhibits good self-adhesiveness and gives rise to a coating film which firmly bonds to a base cloth of polyamide or polyester. The adhesion remains stable for a long period of time. In addition, the coating film is almost non-tacky because the coating composition is cured well even by an organic peroxide.

16 Claims, 1 Drawing Sheet

COATING COMPOSITION FOR AIR BAGS AND AIR BAG

BACKGROUND OF THE INVENTION

1. Field of the Invention

The present invention relates to a coating composition for air bags which firmly bonds to a base cloth, forming a non-tacky cured silicone film thereon. The present invention also relates to an air bag which is fabricated from a base cloth coated with said coating composition.

2. Description of the Prior Art

The air bag is one of the safety devices on the modern automobile. It is located in the steering wheel hub. In the event of an accident, it is inflated between the driver and the steering wheel, thereby saving him from injuries by impact. The air bag is usually fabricated from a nylon cloth coated with chloroprene rubber. Chloroprene rubber, however, does not necessarily have satisfactory heat resistance and weather resistance. This poses a problem associated with the life of the air bag.

The air bag needs to be flame-retardant so that it does not ignite when it is inflated by a pyrotechnic gas. A common practice to remedy the deficiency of chloroprene rubber is to apply a silicone flame-retardant to that part of the chloroprene-coated nylon cloth which is exposed directly to the inflating gas.

The flame-retardant coating is not necessary in the case of an air bag coated with silicone rubber instead of chloprene rubber, because silicone rubber itself can be made flame-retardant by incorporation of a flame retardant. For this reason, silicone rubber is expected to be a coating material for the air bag because of its good heat resistance and weather resistance.

However, silicone rubber is a little poorer than chloroprene rubber in adhesion to a base cloth of polyamide fiber such as nylon. A possible way to eliminate this disadvantage is the pretreatment with a primer, which makes the process complex and aggravates the working environment with organic solvents. Thus, there has been a need for a self-adhesive silicone rubber coating composition which obviates the primer treatment.

A silicone rubber coating composition may be made self-adhesive if it is incorporated with an alkylperoxysilane such as vinyltris(t-butylperoxy)silane, triphenyl(t-butylperoxy)silane, trimethyl(t-butylperoxy)silane, and methyldivinyl(t-butylperoxy)silane, or a silane coupling agent such as vinyltrimethoxysilane, vinyltriethoxysilane, γ-glycidoxypropyltrimethoxysilane, and γ-methacryloxypropyltrimethoxysilane. The silane compound may be replaced by a vinylsilyl group-containing benzoate compound such as t-butylperoxy-4-vinyldimethylsilyl benzoate, which also functions as a vulcanizing agent. However, neither the alkylperoxysilane nor the silane coupling agent provides the self-adhesive silicone rubber composition with sufficient adhesion.

Further, the peroxide-curing type silicone rubber composition poses a problem in the case of hot air vulcanization (HAV method) with an organic peroxide. It remains partly uncured owing to oxygen in the air. Therefore, it gives rise to a tackier thin film than a chloroprene rubber composition. This leads to a possibility that the silicone-coated air bag will not blow up smoothly in the event of an accident.

For these reasons, the silicone rubber coating composition is usually of two-pack type one capable of curing by platinum-catalyzed addition reaction. It has a disadvantage that its curing is easily inhibited by a catalyst poison which might be present in the working environment. In addition, it has a short pot life after the mixing of the two components, which is inconvenient for the continuous operation for a long time. The foregoing has made it necessary to develop a coating composition for the air bag which has a long pot life after the addition of a vulcanizing agent and has no adverse effects on the working environment.

SUMMARY OF THE INVENTION

Accordingly, it is an object of the present invention to provide a coating composition for the air bag which exhibits good adhesion to a base cloth of polyamide or polyester for the air bag and forms, upon curing, a non-tacky thin film on the base cloth. It is another object of the present invention to provide an air bag which has a thin film thereon formed from said coating composition.

To achieve the above-mentioned objects, the present inventors carried out a series of researches, which led to a finding that a silicone composition composed of the following components (A) to (D) exhibits self-adhesiveness and gives rise to a non-tacky cured film having good flame retardance when it is applied to a base cloth for the air bag.

(A) An organopolysiloxane having a viscosity of 300 cSt or more at 25° C. which is represented by the average compositional formula (1) below.

(where $R^1$ denotes a substituted or unsubstituted monovalent hydrocarbon group, and a is a positive number from 1.98 to 2.01.)

(B) An organosilane or a partial hydrolyzate thereof having an isocyanate group and a hydrolyzable group in the molecule.

(C) An organic peroxide.

(D) An organohydrogenpolysiloxane having in the molecule three or more ≡SiH groups (i.e. hydrogen atoms directly connected to silicon atoms).

In the silicone composition of the present invention, components (B) and (D) contribute to the uniform, firm adhesion which lasts for a long time under the hot, humid environment. In addition, component (D) makes the resulting coating film feel less tacky than that of the conventional coating composition.

DETAILED DESCRIPTION OF THE INVENTION

Figure 1:
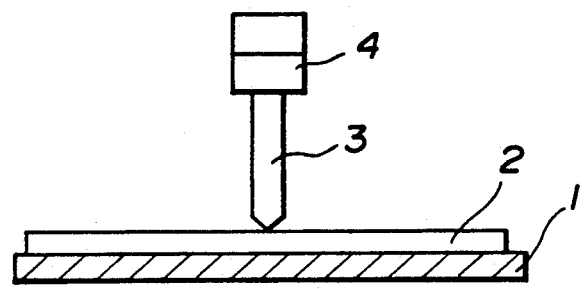
FIG. 1 is a schematic drawing to explain how to test the cured product for physical properties in the Example and Comparative Examples.

According to the present invention, the coating composition for the air bag is composed of the following components (A) to (D).

(A) An organopolysiloxane having a viscosity higher than 300 cSt at 25° C. which is represented by the average compositional formula (1) below.

(where $R^1$ denotes a substituted or unsubstituted monovalent hydrocarbon group, and a is a positive number from 1.98 to 2.01.)

(B) An organosilane or a partial hydrolyzate thereof having an isocyanate group and a hydrolyzable group in the molecule.

(C) An organic peroxide.

(D) An organohydrogenpolysiloxane having in the molecule three or more ≡SiH groups.

The component (A) is an organopolysiloxane represented by the average compositional formula of $R_a^1SiO_{(4-a)/2}$ in which $R^1$ is a monovalent hydrocarbon group. The monovalent hydrocarbon group represented by $R^1$ has preferably 1 to 12 carbon atoms, more preferably 1 to 6 carbon atoms. It includes, for example, alkyl groups (such as methyl group, ethyl group, propyl group, and hexyl group), cycloalkyl groups (such as cyclohexyl group), alkenyl groups (such as vinyl group and allyl group), aryl groups (such as phenyl group and tolyl group), and their substituted groups with part or all of hydrogen atoms replaced by halogen atoms or cyano groups (such as chloromethyl group, trifluoropropyl group, and cyanoethyl group). Preferred examples of $R^1$ include methyl group, ethyl group, phenyl group, γ-trifluoropropyl group, cyanoethyl group, vinyl group, and allyl group. A preferred example of the organopolysiloxane (A) is methylpolysiloxane containing the methyl group in an amount more than 50 mol %, preferably more than 80 mol %. With an amount less than 50 mol %, the polysiloxane is expensive to produce and loses its desirable characteristic properties.

The organopolysiloxane (A) should have a viscosity of 300 cSt or more at 25° C. The desirable viscosity ranges from $1\times10^4$ to $10^8$ cSt. With a viscosity lower than 300 cSt, the organopolysiloxane does not contribute to a coating composition which, upon application to a base cloth for the air bag, forms a coating film having sufficient strength for practical use. The organopolysiloxane preferably has substantially linear structure. In addition, the terminal groups of the organopolysiloxane may be a silanol group, trimethylsilyl group, dimethylvinylsilyl group, methyldivinylsilyl group and trivinylsilyl group. Preferred is a trivinylsilyl group. The organopolysiloxane specified above may be produced by the known process which involves the ring-opening polymerization of cyclic polysiloxane (as an oligomer) in the presence of an acid or alkali.

According to the present invention, the organosilane (B) is preferably one which is represented by the formula (2) below.

$R^2$ and $R^3$ each denote a substituted or unsubstituted monovalent hydrocarbon group having 1 to 12, preferably 1 to 6 carbon atoms as in the case of $R^1$. Examples of $R^2$ and $R^3$ include, in addition to those enumerated above, $C_{1-10}$ alkoxy-substituted $C_{1-10}$ alkyl groups (such as methoxymethyl group, ethoxymethyl group, and methoxyethyl group) and aralkyl groups having 7 to 20 carbon atoms (such as phenylethyl group). $OR^3$ denotes a hydrolyzable group, which includes $C_{1-10}$ alkoxy groups, $C_{2-10}$ alkenyloxy groups, $C_{6-16}$ aryloxy group, $C_{1-10}$ alkoxy-substituted $C_{1-10}$ alkoxyl group, and $C_{7-17}$ aralkyloxy group. $R^4$ denotes a $C_{1-10}$ divalent hydrocarbon group which includes alkylene groups (such as methylene group, ethylene group, and propylene group) and arylene groups (such as phenylene group), and also denotes a $C_{1-10}$ divalent hydrocarbon group containing sulfur atom (sulfur-substituted divalent hydrocarbon group) such as —$R_mSR'_n$— wherein R and R' each represents a divalent hydrocarbon group and m+n=1 to 10.

b is 0, 1 or 2.

Examples of the organosilane (B) are listed below. They may be in the form of hydrolyzate of their own or of their mixture with $(R^3O)_2SiR_2^2$ or $(R^3O)_3SiR^2$.

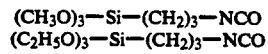
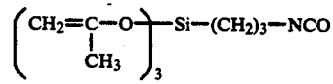
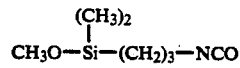
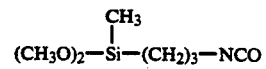
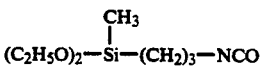
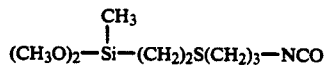

Component (B) may be used in an amount of 0.1 to 20 parts, preferably 0.5 to 10 parts, for 100 parts of component (A). Parts means parts by weight here and hereinafter. With an amount less than 0.1 parts, component (B) does not impart sufficient adhesiveness to the coating composition. With an amount more than 20 parts, component (B) does not contribute to the coating composition which gives rise to a cured coating film superior in tensile strength, elongation, and heat resistance.

According to the present invention, component (C) is an organic peroxide which functions as a curing agent. Examples of the organic peroxide include benzoyl peroxide, 2,4-dichlorobenzoyl peroxide, orthochlorobenzoyl peroxide, di-t-butylperoxide, dicumyl peroxide, t-butyl perbenzoate, t-butyl peracetate, 2,5-dimethyl-2,5-di(t-butylperoxy)hexane, and (t-butylperoxy)myristyl carbonate. Component (C) may be used in an amount of 0.1 to 5 parts, preferably 0.5 to 3 parts, for 100 parts of component (A). With an amount less than 0.1 parts, component (C) is not enough to bring about complete curing, and hence the coating composition will give rise to a cured coating film having low strength and tacky feel. With an amount in excess of 5 parts, component (C) makes the cured coating film poor in tensile strength and elongation.

Component (D) is an organohydrogenpolysiloxane which is preferably represented by the formula (3) below.

 (3)

where $R^5$ denotes an alkyl group having 1 to 10 carbon atoms (such as methyl group), and c and d are positive numbers defined by $c+d=1$ to 3. It should have at least 3 ≡SiH groups (i.e. hydrogen atoms directly connected to silicon atoms) in the molecule. It includes those compounds which are represented by the structural formulas below.

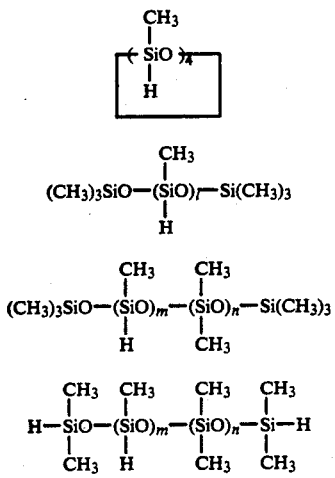

(where l, m, and n each denotes an integer of 1 to 200.) Component (D) may be used in an amount of 0.1 to 10 parts, preferably 1 to 5 parts, for 100 parts of component (A). With an amount less than 0.1 parts, component (D) is not enough to make the coating film feel non-tacky. With an amount in excess of 10 parts, component (D) does not contribute to the coating composition which gives rise to a cured coating film superior in tensile strength and elongation.

According to the present invention, the coating composition composed of components (A) to (D) mentioned above may optionally be incorporated with platinum fine powder or a platinum compound (such as chloroplatinic acid and chloroplatinic acid-olefin complex compound) in order to impart flame retardance to it. The amount of this optional component may be 0.001 to 5 parts, preferably 0.05 to 0.5 parts, for 100 parts of component (A).

The addition of platinum fine powder or platinum compound might make the coating composition susceptible to scorching during storage. This problem will be avoided if platinum is used in combination with a reaction regulator such as methyl vinyl siloxane, acetylene alcohol, or acetylene alcohol with its hydroxyl group blocked with trimethylsilyl group. The amount of this reaction regulator should be 0.01 to 10 parts, preferably 0.05 to 5 parts, for 100 parts of component (A).

The coating composition may preferably be incorporated with one or more fillers to impart an adequate viscosity to the coating composition, thereby improving the workability. Fillers also contribute to improvement of the cured coating film in physical properties such as hardness, tensile strength, and elongation. Fillers may be used in the form of fine particles or fiber. Examples of fillers include fumed silica, precipitated silica, quartz powder, diatomaceous earth, hollow glass beads, iron oxide, zinc oxide, titanium oxide, magnesium oxide, talc, aluminum silicate, alumina, calcium carbonate, carbon black, asbestos, glass fiber, carbon fiber, polyester fiber, polytetrafluoroethylene powder, and polyvinyl chloride powder. An additional example is a resinous polysiloxane copolymer composed of $R^3SiO_{0.5}$, $R^2SiO$, and $RSiO_{1.5}$ units (where R denotes a monovalent hydrocarbon group). The amount of these fillers should be 20 to 200 parts, preferably 30 to 100 parts, for 100 parts of component (A). Fillers less than 20 parts or more than 200 parts will not impart desired physical properties to the coating composition. Incidentally, the average particle diameter of the filler should be smaller than 50 μm.

Further, the coating composition of the present invention may optionally be incorporated with any known additive which is commonly used for this kind of composition. Examples of the additive include silane coupling agents (such as γ-glycidoxypropyltrimethoxysilane, γ-mercaptopropyltrimethoxysilane, γ-aminopropyltrimethoxysilane, and vinyltrialkoxysilane), metal salts of organic carboxylic acids, titanate esters, heat stabilizer, flame retardant, and dispersing agents (such as diphenylsilane diol, alkoxy silane, carbon-functional silane, and silanol-containing low-molecular-weight siloxane).

According to the present invention, the coating composition is prepared by mixing the above-mentioned components. For application to a base cloth (such as nylon) for air bags, the coating composition should be used in the form of solution in an adequate organic solvent free of active hydrogen which reacts with the organosilane as component (B). Examples of the solvent include benzene, toluene, xylene, hexane, heptane, and kerosene. The amount of solvent should be 10 to 1000 parts, preferably 100 to 300 parts, for 100 parts of the coating composition.

The coating composition prepared as mentioned above is applied to a base cloth for air bags on which a cured coating film is formed. Examples of the base cloth include woven fabrics of nylon, tetron, vinylon, polyester, and polyurethane, of which nylon and polyester are preferable.

The coating composition may be applied, as such or in the form of solution in an adequate solvent, to a base cloth by calendering, knife coating, brushing, dip coating, or spraying.

After application to a base cloth, the coating composition may undergo hot air vulcanization at 110° to 150° C. for several seconds to 20 minutes. The resulting cured film is silicone rubber, silicone resin, or silicon gel, which varies in crosslinking density depending on the components used.

EXAMPLES

The invention will be explained in more detail with reference to the following examples and comparative examples which are not intended to restrict the scope of the invention.

EXAMPLE 1 AND COMPARATIVE EXAMPLES 1 AND 2

Compound A was prepared from the following components (i) to (iii) by compounding in a kneader at 180° C. for 2 hours.

(i) 100 parts of organopolysiloxane composed of 99.8 mol % of dimethylsiloxane unit and 2.0 mol % of vinylmethylsiloxane unit, with both the molecular terminal blocked with vinyldimethylsilyl groups. This organopolysiloxane is characterized by that its 25 wt % solution in toluene has a relative viscosity of 2.8 at 25° C.

(ii) 40 parts of hydrophobic fumed silica having a specific surface area of 230 m²/g (surface-treated with trimethylsilyl groups).

(iii) 1.0 part of α,ω-dimethylpolysiloxanediol, with both the molecular terminals blocked with silanol groups.

One hundred parts of compound A was uniformly mixed with 3.5 parts of 2,4-dichlorobenzoyl peroxide (50% pure). The mixture was formed into a thin sheet using a three-roll mill, and the sheet was dissolved in toluene to give a toluene solution (I) containing 25 wt % silicone components.

To 100 parts of toluene solution (I) were added the following two compounds (iv) and (v)

(iv) Isocyanate group-containing silane represented by the formula $(C_2H_5O)_3Si(CH_2)_3NCO$, in an amount of 5 parts for 100 parts of solids in toluene solution (I). Organohydrogenpolysiloxane, with both the terminals blocked with trimethylsilyl groups, represented by the formula (4) below, in an amount of 4 parts for 100 parts of solids in toluene solution (I).

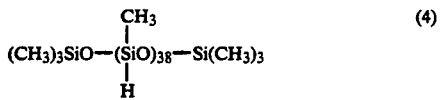

For comparison, a sample was prepared in the same manner as mentioned above except that it does not contain the isocyanate group-containing silane and organohydrogenpolysiloxane (Comparative Example 1). Another sample for comparison was prepared in the same manner as mentioned above except that it does not contain the organohydrogenpolysiloxane (Comparative Example 2).

Each of the samples mentioned above was applied to one side of a plain weave fabric of nylon, with a density of 18×17/25 mm, so as to form a 100 μm thick film (after drying). After air-drying at 15° C. for 30 minutes, the coated cloth was heated at 180° C. for 7 minutes for curing.

The cured coating film was tested for physical properties by the following two methods.

(1) Adhesion between the coating film and the nylon base cloth

The cured coating film was scratched repeatedly with a stainless steel stylus under a load of 100 g, as shown in FIG. 1, until the coating film was completely peeled from the base cloth. The number of scratching cycles indicates adhesion. (This test is illustrated in FIG. 1, in which there are shown the nylon base cloth 1, the cured silicone coating film 2, the stainless steel stylus 3, and the weight 4 to apply a load to the stylus 3.) The same test as mentioned above was performed after each sample had been conditioned (for swelling) at 85° C. and 95% RH for 1 week.

(2) Surface tackiness of the cured silicone coating film

Figure 2:
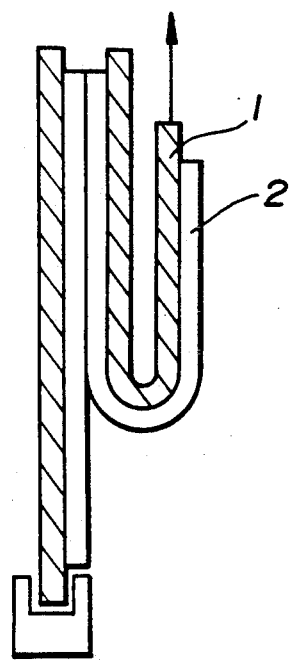
FIG. 2 is a schematic drawing to explain how to test the cured product for surface tackiness in the Example and Comparative Examples.

Two pieces of the coated nylon cloth were pressed to each other, with the coating film inside, under a load of 20 kgf/cm² at 25° C. for 12 hours. A 2.5-cm wide test piece was cut out of the cloth. The test piece underwent 180° peel test at a rate of 10 mm/min using a tensile tester, as illustrated in FIG. 2, in which there are shown the nylon cloth 1 and the cured silicone coating film 2. The load required to peel the test piece indicates the surface tackiness of the cured silicone film.

The test results are shown in Table 1.

TABLE 1

| | | Example 1 | Comparative Example 1 | Comparative Example 2 |
|---|---|---|---|---|
| Composition (parts by weight) | Compound A | 100 | 100 | 100 |
| | 2,4-dichlorobenzoyl peroxide | 3.5 | 3.5 | 3.5 |
| | Toluene | 296 | 296 | 296 |
| | NCO-containing trimethoxysilane | 5 | — | 5 |
| | Organohydrogen polysiloxane | 4 | — | — |
| Properties of cured coating film | Adhesion to base cloth (times) | 100< | 5 | 75 |
| | Adhesion to base cloth after swelling (times) | 100< | 2 | 61 |
| | Surface tackiness (g/2.5 cm wide) | 30 | 145 | 140 |

As mentioned above, the present invention provides a coating composition to be applied to a base cloth for the air bag. It exhibits good self-adhesiveness and gives rise to a coating film which firmly bonds to a base cloth of polyamide or polyester. The adhesion remains stable for a long period of time. In addition, the coating film is almost non-tacky because the coating composition is cured well even by an organic peroxide.

What is claimed is:

1. A coating composition capable of curing to a non-tacky thin silicone film for an air bag which comprises:
   (A) an organopolysiloxane having a viscosity of 300 cSt or more at 25° C. which is represented by the average composition formula (1) below;

$$R_a^1SiO_{(4-a)/2} \quad (1)$$

where R denotes a substituted or unsubstituted monovalent hydrocarbon group, and a is a positive number from 1.98 to 2.01,
   (B) an organosilane or a partial hydrolyzate thereof having an isocyanate group and a hydrolyzable group in the molecule,
   (C) an organic peroxide, and
   (D) an organohydrogenpolysiloxane having in the molecule three or more ≡SiH groups.

2. The composition of claim 1 wherein the organosilane of component (B) is represented by the formula (2):

where R² and R³ each denote a substituted or unsubstituted monovalent hydrocarbon group, R⁴ denotes a divalent hydrocarbon group or sulfur-substituted divalent hydrocarbon group and b is 0, 1 or 2.

3. The composition of claim 1 wherein component (B) is used in an amount of 0.1 to 20 parts by weight per 100 parts by weight of component (A), component (C) is used in an amount of 0.1 to 5 parts by weight per 100 parts by weight of component (A), and component (D) is used in an amount of 0.1 to 10 parts by weight per 100 parts by weight of component (A).

4. The composition of claim 1 which further comprises platinum fine powder or another platinum compound in an amount of 0.001 to 5 parts by weight per 100 parts by weight of component (A).

5. The composition of claim 1 which further comprises a filler in an amount of 20 to 200 parts by weight per 100 parts by weight of component (A).

6. The coating composition of claim 1 wherein the organic peroxide (C) is benzoyl peroxide, 2,4-dichlorobenzoyl peroxide, orthochlorobenzoyl peroxide, di-t-butylperoxide, dicumyl peroxide, t-butyl perbenzoate, t-butyl peracetate, 2,5-dimethyl-2,5-di(t-butylperoxy)-hexane, and (t-butylperoxy)-myristyl carbonate or mixtures thereof.

7. The coating composition of claim 4, wherein the platinum compound is chloroplatinic acid or a chloroplatinic acid-olefin complex.

8. The coating composition of claim 5, wherein the filler is fumed silica, precipitated silica, quartz powder, diatomaceous earth, hollow glass beads, iron oxide, zinc oxide, titanium oxide, magnesium oxide, talc, aluminum silicate, alumina, calcium carbonate, carbon black, asbestos, glass fiber, carbon fiber, polyester fiber, polytetrafluoroethylene powder, polyvinyl chloride powder, resinous polysiloxane copolymer or mixtures thereof.

9. An air bag comprising a base cloth and a thin, non-tacky, cured coating film coated thereon wherein the cured coating film is prepared by curing a coating composition comprising:
(A) an organopolysiloxane having a viscosity of 300 cSt or more at 25° C. which is represented by the average composition formula (1) below;

where R denotes a substituted or unsubstituted monovalent hydrocarbon group, and a is a positive number from 1.98 to 2.01,
(B) an organosilane or a partial hydrolyzate thereof having an isocyanate group and a hydrolyzable group in the molecule,
(C) an organic peroxide, and
(D) an organohydrogenpolysiloxane having in the molecule three or more ≡SiH groups.

10. An air bag of claim 9, wherein the organosilane of component (B) is represented by the formula (2):

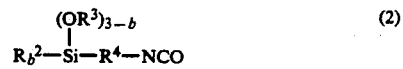

where $R^2$ and $R^3$ each denote a substituted or unsubstituted monovalent hydrocarbon group, $R^4$ denotes a divalent hydrocarbon group or sulfur-substituted divalent hydrocarbon group and b is 0, 1 or 2.

11. An air bag of claim 9, wherein component (B) is used as an amount of 0.1 to 20 parts by weight per 100 parts by weight of component (A), component (C) is used in an amount of 0.1 to 5 parts by weight per 100 parts by weight of component (A), and component (D) is used in an amount of 0.1 to 10 parts by weight per 100 parts by weight of component (A).

12. An air bag of claim 9 which further comprises platinum fine powder or another platinum compound in an amount of 0.001 to 5 parts by weight per 100 parts by weight of component (A).

13. An air bag of claim 9 which further comprises a filler in an amount of 20 to 200 parts by weight per 100 parts by weight of component (A).

14. An air bag of claim 9 wherein the organic peroxide (C) is benzoyl peroxide, 2,4-dichlorobenzoyl peroxide, orthochlorobenzoyl peroxide, di-t-butylperoxide, dicumyl peroxide, t-butyl perbenzoate, t-butyl peracetate, 2,5-dimethyl-2,5-di(t-butylperoxy)hexane, and (t-butylperoxy)myristyl carbonate or mixtures thereof.

15. An air bag of claim 9, wherein the platinum compound is chloroplatinic acid or a chloroplatinic acid-olefin complex.

16. An air bag of claim 13, wherein the filler is fumed silica, precipitated silica, quartz powder, diatomaceous earth, hollow glass beads, iron oxide, zinc oxide, titanium oxide, magnesium oxide, talc, aluminum silicate, alumina, calcium carbonate, carbon black, asbestos, glass fiber, carbon fiber, polyester fiber, polytetrafluoroethylene powder, polyvinyl chloride powder, resinous polysiloxane copolymer or mixtures thereof.

* * * * *

UNITED STATES PATENT AND TRADEMARK OFFICE
CERTIFICATE OF CORRECTION

PATENT NO. : 5,258,211
DATED : November 2, 1993
INVENTOR(S) : Kazuma MOMII et al.

It is certified that error appears in the above-indentified patent and that said Letters Patent is hereby corrected as shown below:

Claim 1; Col. 8; Line 37:

Change " R " to read -- $R^1$ --

Claim 9; Col. 9; Line 34:

Change " R " to read -- $R^1$ --

Signed and Sealed this

Eighth Day of November, 1994

Attest:

BRUCE LEHMAN

Attesting Officer

Commissioner of Patents and Trademarks